United States Patent

[11] 3,603,147

[72] Inventor Frank D. Dorman
St. Paul, Minn.
[21] Appl. No. 874,288
[22] Filed Nov. 5, 1969
[45] Patented Sept. 7, 1971
[73] Assignee Thermo-Systems, Inc.
St. Paul, Minn.

[54] PULSED ANEMOMETER CIRCUIT
18 Claims, 8 Drawing Figs.
[52] U.S. Cl. .................................................. 73/204,
73/189
[51] Int. Cl. .................................................. G01p 5/10
[50] Field of Search .......................................... 73/204, 27,
362, 189

[56] References Cited
UNITED STATES PATENTS
2,437,449  3/1948  Ames, Jr. et al. ............. 73/204 UX
2,972,885  2/1961  Laub ............................ 73/204
3,085,431  4/1963  Yerman et al. ............... 73/204
3,352,154  11/1967 Djorup ......................... 73/204 X
3,429,178  2/1969  Durbin ......................... 73/27

Primary Examiner—Charles A. Ruehl
Attorney—Burd, Braddock & Bartz

ABSTRACT: An electronic circuit for operating resistance sensors at a constant temperature to obtain measurements of velocity and direction in fluids. The circuit has a balancing bridge including a sensor and amplifier producing a pulsed output voltage directly proportional to the electrical power input to the sensor and proportional to the heat transfer rate between the sensor and fluid. The output voltage of the amplifier triggers an electronic switch operable to control the voltage supplied to the bridge. One form of the circuit has a dummy load coupled to the switch to take the power supplied to the switch when the bridge is cut off from the voltage supply. The circuit can have a plurality of bridges and sensors coupled to a single amplifier.

INVENTOR.
FRANK D. DORMAN
BY Burd, Braddock & Barty
ATTORNEYS 3,603,147

PULSED ANEMOMETER CIRCUIT

BACKGROUND OF INVENTION

Sensing instruments having hot-wire or hot-film, resistance elements, known as sensors, have been developed for measuring fluid flow parameters, as velocity, mass flow, turbulence and pressure by sensing the heat transfer rate (heat flux) between the electrically heated sensor and the flow medium. A constant temperature anemometer circuit is used to heat and sense the rate of heat transfer. The basic signal of this circuit depends on the fluid composition, mass flow and temperature difference. For many measurements, density is constant and the instrument measures velocity. Examples of this type of instrumentation and circuits are shown in U.S. Pats. No. 3,138,025 and No. 3,333,470. These constant temperature anemometer circuits have a bridge electrically coupled to the sensor controlled at a constant resistance and, therefore, at a constant temperature. An amplifier, coupled to the bridge, senses any change in bridge balance due to flow changes and electrical current through the bridge to control the temperature of the sensor. The heat transfer rate is a function of the type of fluid and flow of fluid over the sensor, as well as the temperature of the fluid. As the flow of the medium increases, the sensor tends to cool causing an off-balance of the bridge. This off-balance is immediately sensed by the amplifier which feeds back more current to bring the bridge back into balance. Hence, the sensor controls a certain resistance that depends on the value of a control resistor in the opposite leg of the bridge. The control resistor functions to set the sensor operating temperature and to provide temperature compensation. FIG. 1 of the drawings shows a schematic diagram of the constant temperature anemometer circuit. For the system of FIG. 1 to operate, the sensor 14 must be in thermal equalibrium with the fluid. Since current adds heat, this heat must be transferred to the fluid for thermal equalibrium. Therefore, when the fluid conditions change in a manner to affect the heat transfer rate between the sensor and the fluid, the current to the sensor must change to maintain thermal equalibrium.

In the idealized case, the amplifier has infinite frequency response and infinite gain. The sensor is then maintained at a truly constant resistance, as long as there is some heat transfer from the sensor to the fluid and as long as the amplifier has sufficient output. For example, an increase in heat transfer from the sensor to the fluid would tend to cool the sensor, thereby lowering its resistance. This will cause an input to the amplifier, since the voltage on the bridge side of the amplifier will be lower than on the opposite side of the amplifier. The phase of the amplifier is such that this will increase the output current from the amplifier. This current will heat the sensor until the voltage on opposite sides of the amplifier is equal. In the case of an idealized amplifier, this all takes place instantaneously and the sensor never actually changes temperature. With practical systems, the frequency response and gain of the amplifier are limited by stability considerations.

The output of the constant temperature anemometer circuit is the voltage output of the amplifier. This is directly proportional to the current in the sensor. It is also directly proportional to the square root of the electrical power in the sensor. This electrical power to the sensor is equal to the heat transfer from the sensor to the fluid by the requirement of sensor thermal equalibrium. It would be more convenient to have an output proportional to power, since this is equal to the primary measurement or rate of heat transfer between the sensor and fluid.

The practical anemometer circuit should maintain the sensor at a constant resistance. On an amplifier connected to a low source resistance, the primary source of error is the equivalent input voltage drift of the amplifier. This drift is usually specified both for temperature and time. For accuracy considerations, it becomes important to identify how much affect the amplifier drift has on the ability of the system to maintain constant sensor resistance. A large current in the sensor minimizes the error and sensor resistance for a given equivalent input drift of the amplifier. The output of the constant temperature anemometer circuit is a voltage level. In many present day control systems, this signal must be converted to a digital output through an analog to digital converter for compatibility with computers. A direct digital output in these cases would have a significant advantage.

SUMMARY OF INVENTION

The invention is directed to a pulsed anemometer circuit that produces a pulsed output signal directly proportional to the heat transfer rate between a resistance sensor and surrounding fluid. This signal can be used as a direct digital input to computers or other digital circuits. The pulsed anemometer circuit has switch means triggered by an amplifier connected in a bridge containing the sensor. Oscillator means, acting on the switch, connects a supply voltage to the bridge at regular intervals. The amplifier turns the pulsed voltage off when the sensor heats up sufficiently to balance the bridge. The output variable of this circuit is the "on" time of the voltage on the bridge which is proportional to the heat transfer rate between the sensor and the fluid. This circuit has high sensitivity, as the amplifier operates only with maximum current in the sensor. The pulsed anemometer circuit can operate two sensors by using a single amplifier connected to two bridges and switch means for the bridges. The two sensors can be a split film sensor unit. The bridges are operated in sequence to balance both bridges. The bridges and amplifier can be ground referenced to permit a plurality of bridges with sensors to be connected to an amplifier without affecting the sensitivity of the amplifier for the "on" sensor. A standby or dummy load may be joined with the switch means to take the power supplied to the switch means when the bridge is cut off from the voltage supply.

IN THE DRAWINGS

Figure 1:
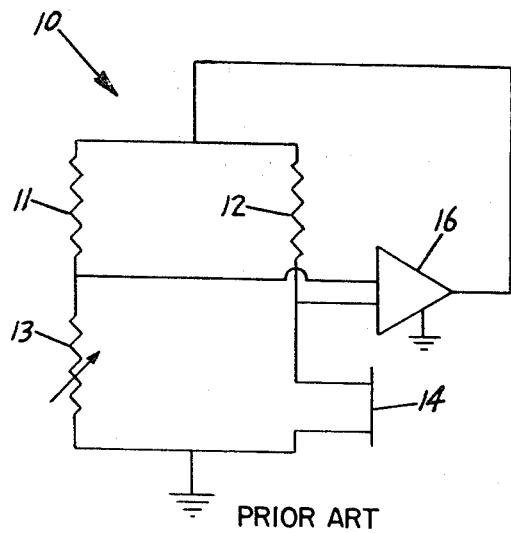
FIG. 1 is an electrical schematic diagram of a constant temperature anemometer circuit.

Referring to the drawings, there is shown in FIG. 1 a conventional constant temperature anemometer circuit, indicated generally at 10, having a bridge with resistors 11 and 12, variable or control resistor 13, and a sensor 14. The sensor 14 is an electrical resistance element which has a small wire or thin film. The bridge includes an amplifier 16 which functions to sense the off-balance of the bridge and feed back more current to the top of the bridge to bring the bridge back into balance. The sensor 14 is controlled at a certain resistance which depends on the value of the control resistor 13 in the opposite leg of the bridge. This is the basic anemometer circuits, as described in U.S. Pats. No. 3,138,025 and No. 3,333,470.

Figure 2:
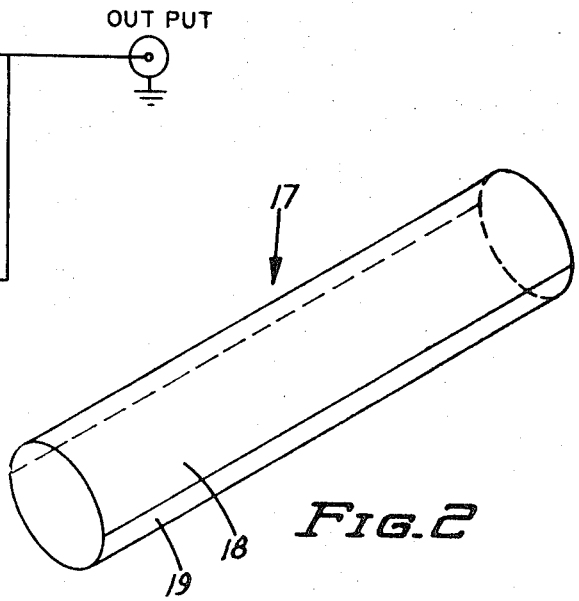
FIG. 2 is a perspective view of a cylindrical split film sensor.

FIG. 2 is an enlarged perspective view of a cylindrical split film sensor 17 having resistor films 18 and 19 to provide separate readings to determine the variation and heat transfer rate around the cylinder for a given velocity direction. This reading is a function of the angle and the ratio of heat transfer between the two films 18 and 19. This technique for resolving directional ambiguity is the subject of a copending U.S. Pat. application, Ser. No. 833,434. The accuracy of the reading is related to the accuracy in which the resistance of the sensor is maintained constant. With the split film sensor 17, this is more critical because of the heat transfer taking place directly between the two films through a ceramic or glass substrate. At low velocities, the coupling, relative to the heat transfer to the fluid, is particularly strong. There are substantial shifts in the ratio of heat transfer between the films 18 and 19 if the control circuit operating one film 18 drifts with respect to the control circuit operating one film 18 drifts with respect to the control circuit operating the other film 19 on the same substrate. The result will be a substantial error in determining when the velocity vector crosses the split between the films. Particularly at low velocities, this error will occur much quicker than a velocity error due to a similar shift in resistance of one or both films of the sensor when caused by equivalent input drift of the circuit.

Figure 3:
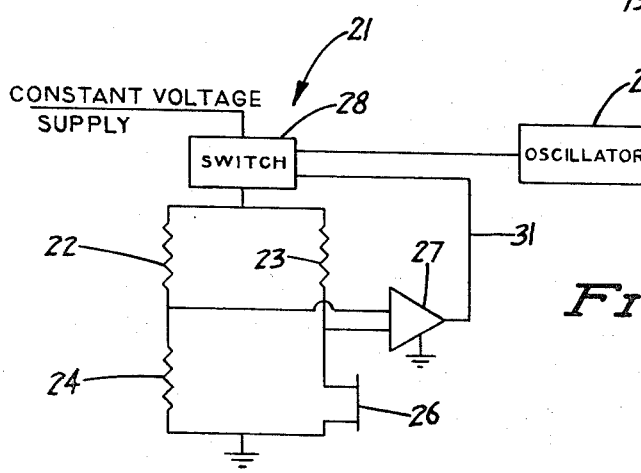
FIG. 3 is an electrical schematic diagram of a pulsed anemometer circuit.

FIG. 3 shows a basic electrical diagram of a pulsed anemometer circuit designed to overcome the limitations of prior art anemometer circuits. The pulsed anemometer circuit, indicated generally at 21, has a bridge with resistors 22 and 23, control resistor 24, and sensor 26. An amplifier 27 is connected across the bridge. A switch 28, located in the input line to the bridge, connects the bridge to a constant voltage supply. The operation of the switch 28 is controlled by an oscillator 29 and the amplifier 27, which is connected to the switch with a line 31.

Figure 4:
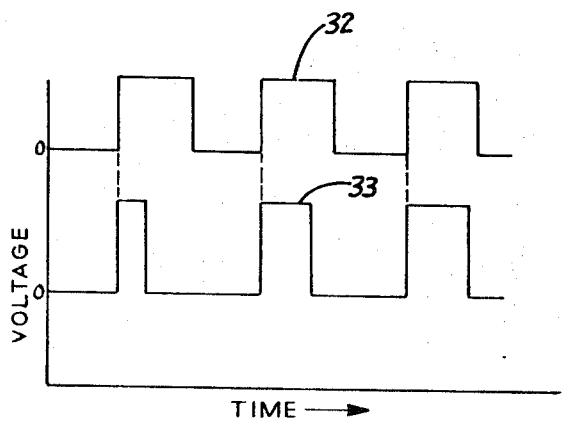
FIG. 4 is an operational sequence graph of the circuit of FIG. 3.

The oscillator 29 connects the constant voltage supply to the top of the bridge at regular intervals to trigger the switch 28 with a pulsed signal, shown at 32 in FIG. 4. The signal 32 is a pulsed voltage that has constant frequency. The amplifier 27 sends a signal to the switch 28 to turn the voltage off when the sensor 26 heats up sufficiently to balance the bridge. The voltage supply is sufficient so that adequate current will be supplied with maximum heat transfer between the sensor 26 and the surrounding fluid. The input signal 33 to the bridge is indicated in FIG. 4. Signal 33 is of varying duration, depending on the time it takes to balance the bridge. Amplifier 27 operates only at a maximum current in the sensor 26. This minimizes the error in the change and resistance of the sensor for a given equivalent input drift of the amplifier. The voltage on the bridge is constant. Accordingly, the output variable is on the "on" time of the voltage on the bridge. This information is easily converted into a digital signal. Since the "on" time is the variable and the voltage is constant, the "on" time is directly proportional to the electrical power input to the sensor. Therefore, the output is proportional to the heat transfer rate between the sensor and the surrounding fluid. This pulsed anemometer circuit largely overcomes the limitations of the standard constant temperature anemometer circuit shown in FIG. 1.

Figure 5:
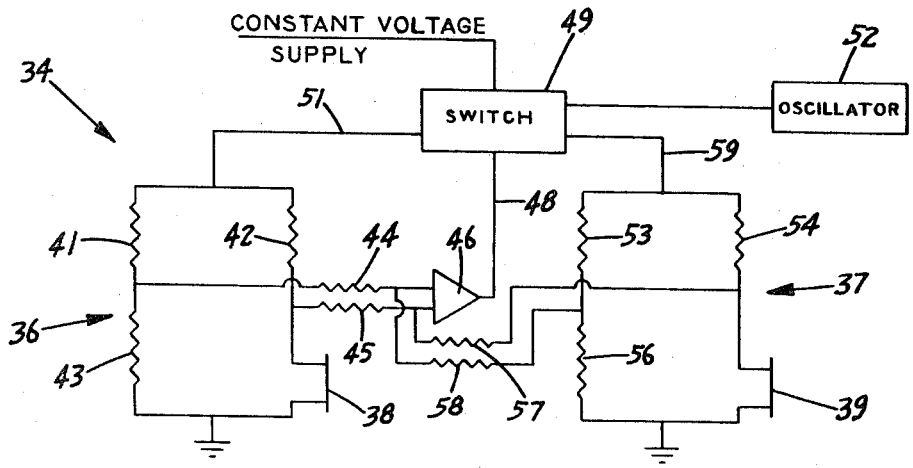
FIG. 5 is a diagrammatic circuit diagram of a pulsed anemometer circuit for operating two sensors.
Figure 6:
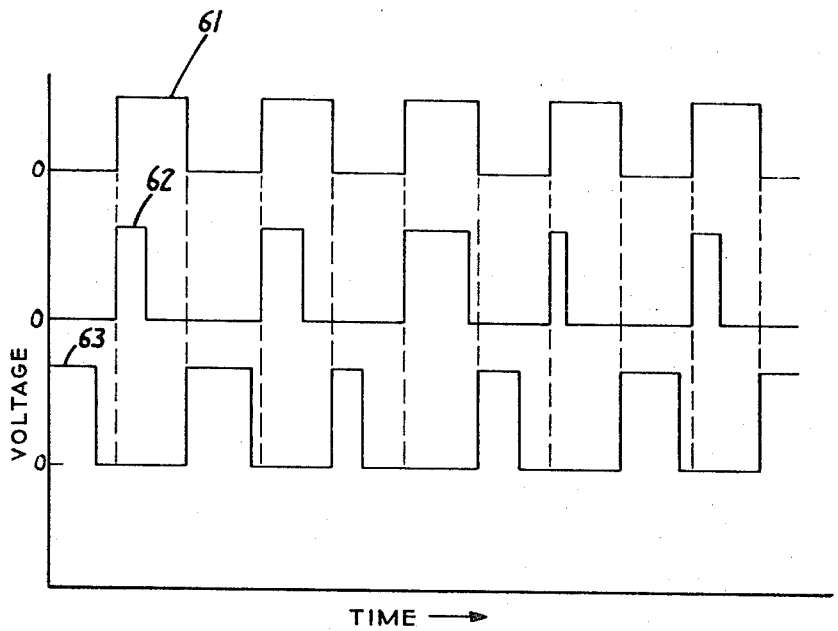
FIG. 6 is an operational sequence graph for the circuit of FIG. 5.

FIG. 5 shows a modification of the pulsed anemometer circuit, indicated generally at 34, for separate sensors 38 and 39. The sensors 38 and 39 can be split film type sensors, as shown in FIG. 2. A single amplifier 46 is used to sense the turn-off time for the two individual sensors. Any amplifier drift is shared by the two sensors. The circuit 34 has a first bridge, indicated generally at 36, containing the sensor 38 and a second bridge, indicated generally at 37, containing the sensor 39. The first bridge 36 has resistors 41, 42, and 43 to balance the sensor 38. The amplifier 46 is connected across the bridge through the use of resistors 44 and 45. The second bridge 37 has resistors 53, 54, and 56 to balance the sensor 39. The amplifier 46 is connected across the bridge 37 through resistors 57 and 58. The amplifier 46 is connected to both of the bridges 36 and 37. The output of the amplifier 46 is communicated through a line 48 to a switch 49. The switch 49 is connected with a first line 51 to the top of the bridge 36 and with a second line 59 to the top of the bridge 37. The switch 49 is triggered with an oscillator 52 which impresses a square wave signal on the switch 49, which operates the bridge 36 on the up-pulse and the bridge 37 on the down-pulse. This phased relationship of the oscillator signal 61 is shown in FIG. 6. The square wave oscillator signal 61 controls the operation of the amplifier signals 62 and 63. The current in the bridges is set so that the maximum "on" time of one bridge is less than one-half the time for a complete cycle of the oscillator signal. This restriction is necessary, since both of the bridges cannot be "on" simultaneously. When the bridges are balanced, the amplifier turns off the power supply to the bridges. This occurs in sequence, as the amplifier input to one bridge is essentially at a ground potential when the other bridge is "on". The amplifier 46 is used to sense balance in both bridges, and any amplifier drift is shared by both bridges. The output signals 62 and 63 are pulsed voltage signals that are proportional to the heat transfer rate between the sensors 38 and 39 and the surrounding fluid. Both of these signals are a variable of time that can be readily used as digital signals compatible as a computer or other digital circuit input.

Figure 7:
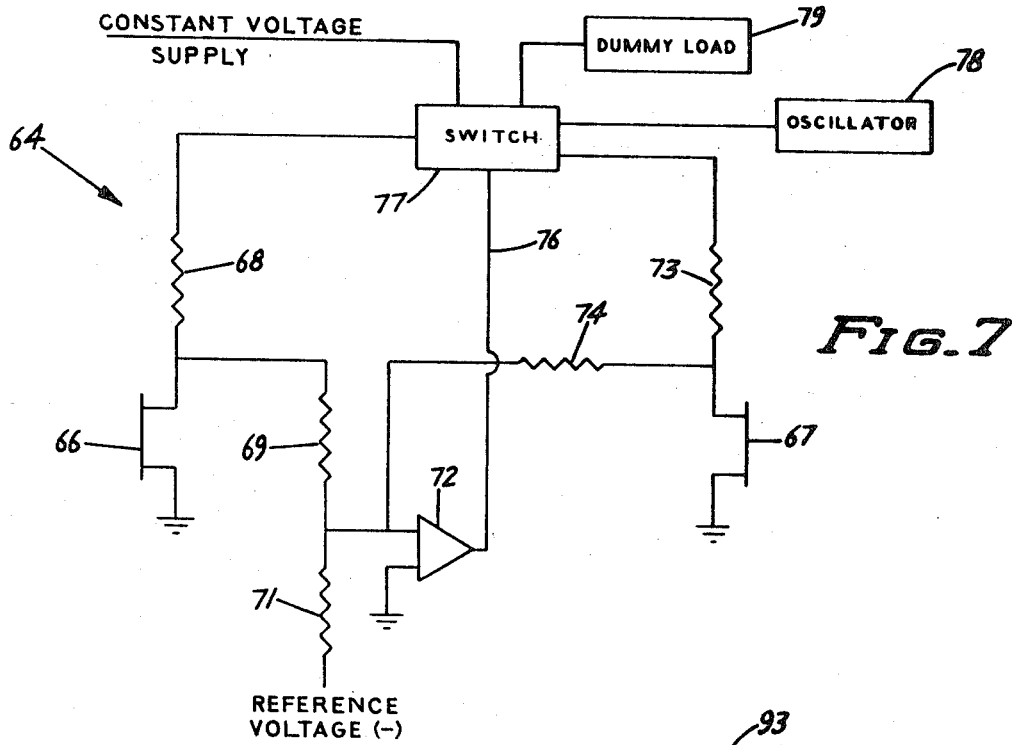
FIG. 7 is a modification of a pulsed anemometer circuit for operating two sensors.

Referring to FIG. 7, there is shown a further modification of the pulsed anemometer circuit for a plurality of sensors, indicated generally at 64. The circuit 64 has a pair of bridges connected to sensors 66 and 67. The first bridge has resistors 68, 69, 71 connected to sensor 66 and an amplifier 72. The second bridge has resistors 73 and 74 connected to sensor 67 and amplifier 72. Resistor 71 is connected to a negative reference voltage so that a zero cross amplifier 72 can be ground referenced. This improves the circuit, since the amplifier input is now always near ground potential. When the sensor 66 is off, both ends of the resistor 69 between the sensor and the amplifier input are at ground potential. Therefore, as many sensors as desired could be connected to one zero cross amplifier without affecting the sensitivity of the amplifier for the "on" sensor. The output of the amplifier 72 is directed through a line 76 to a switch 77. The switch 77 is connected to the separate bridges of the anemometer circuit. An oscillator 78 imparts a square wave actuating signal to the switch 77. When the power supply is not connected to either of the bridges, the power is shunted to a dummy load 79 of a size about equal to the load on the sensors 66 and 67 plus the resistors in series with it. In this manner, the power supply only has to make minor adjustments during switching. This improves both the response time of the switch supply and the accuracy of the switch. Also, it prevents transients from being transmitted back into the main power supply.

The circuits 64 is shown with two sensors. The circuit 64 is adapted to utilize more sensors, since adding more sensors does not change the sensitivity of the zero cross amplifier 72 on the "on" sensor. The total number of sensors operated by one zero cross amplifier 72 and one voltage supply depends on practical limitations, such as the minimum "on" time and maximum voltages.

The switching oscillator frequency can be varied over a wide range depending on the sensor used and the measurement. For a small sensor where frequency response is important, oscillator frequencies of 10 kHz. or more can be used. At the other extreme, a very large sensor in an application, where frequency response is not important, might use an oscillator frequency of 100 Hz. or less. One advantage of going to lower frequencies is the possibility of making the output directly compatible with the readout equipment. As long as the switching frequency is high enough so that no significant cooling of the sensor takes place, the measurement of one "on" time represents a true average for that "on" time plus the "off" time preceding it. At the same time, significant cooling of the sensor is not serious in applications where it is calibrated in and the heat transfer changes occur at frequencies significantly lower than the switching frequency.

Figure 8:
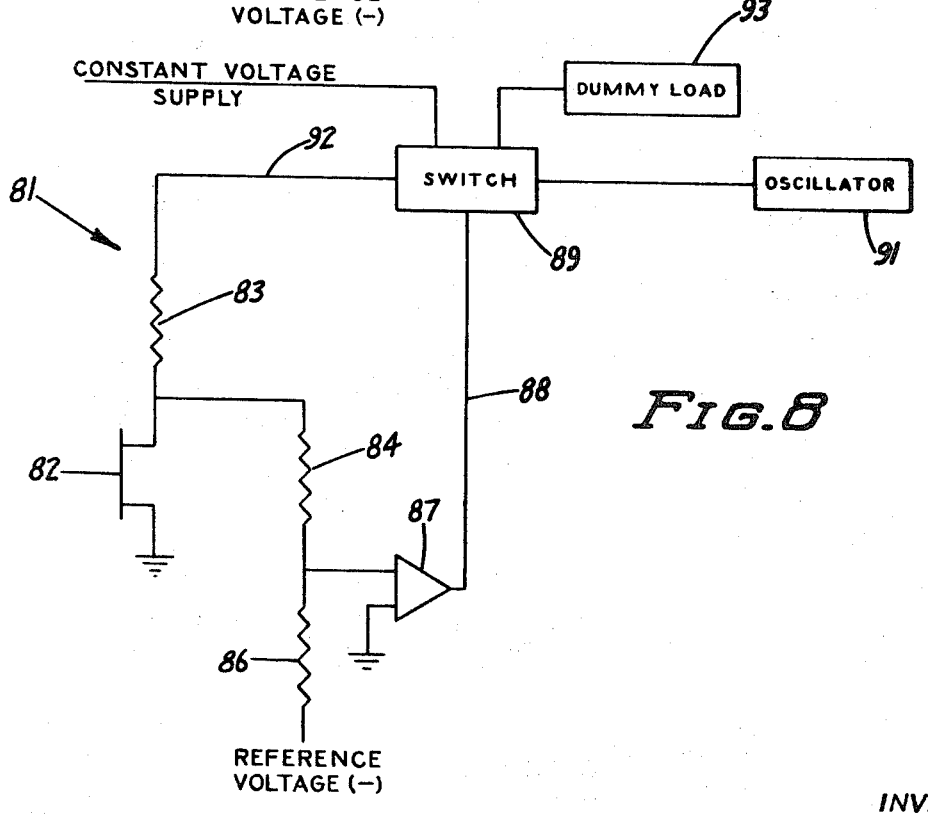
FIG. 8 is a modification of a pulsed anemometer circuit for a sensor.

Referring to FIG. 8, there is shown a further modification of the pulsed anemometer circuit, indicated generally at 81. The circuit 81 has a single bridge with a sensor 82 coupled with resistors 83, 84, and 86. The resistor 86 is connected to a negative reference voltage. A zero cross amplifier 87 is connected between the resistors 84 and 86 and to ground. An amplifier output line 88 is connected to a switch 89 for controlling the input power to the bridge. Switch 89 is provided with a constant voltage supply which is regulated by a square wave signal from an oscillator 91. A line 92 connects the switch to the top of the bridge 83. The switch is also connected to a dummy load 93 of a size about equal to the load on the sensor 82 and resistor 83. During the period of time that the load is switched off of the bridge, it is shunted to the dummy load 93 so that the power supply only has to make minor adjustments during switching.

The switches of the pulsed anemometer circuits are designed to be accurate and fast. The voltage is switched with transistors, with the regulations being done at the input to the bridges. The switches connected to the bridges also function to reduce the temperature of the sensors to a small temperature rise above the environmental fluid. All of the logic can be done with digital integrated circuits and the amplifiers can be linear integrated circuits.

While there have been shown and described preferred embodiments of the invention, modifications and changes in particular circuits can be made without departing from the invention. For example, each bridge circuit can be provided with a control resistor or balance potentiometer, similar to variable resistor 13 shown in FIG. 1, to equalize the sensor temperature. The sensor overheat can be lowered to check the balance by switching in a resistor to change the effective reference voltage. The balance of both sensors connected to a common amplifier can be adjusted by a potentiometer connected to the top of the bridges of the sensors that feeds current to the base of the zero cross amplifier.

The embodiments of the invention in which an exclusive property or privilege is claimed are defined as follows:

1. A pulsed anemometer circuit comprising: bridge means including a resistance sensor and an amplifier; switch means connected to the resistance sensor, the amplifier, and an external voltage supply, said switch means operable to supply a pulsed voltage signal to the bridge means; means to sequentially operate the switch means to connect the bridge means with said voltage supply, said amplifier operative to turn off said switch means during the time the bridge means is balanced and to turn on said switch means during the time said bridge means is unbalanced, whereby the sensor is maintained at a substantially constant temperature.

2. The circuit of claim 1 wherein: said amplifier is connected to a negative reference voltage.

3. The circuit of claim 1 wherein: said means to operate the switch means is an oscillator imparting a square wave signal to the switch means.

4. The circuit of claim 1 including: a dummy load connected to the switch means, said switch means operative to connect the voltage supply to the dummy load when the bridge means is balanced.

5. The circuit of claim 4 wherein: said amplifier is connected to a negative reference voltage.

6. A pulsed anemometer circuit comprising: first bridge means having a first resistance sensor; second bridge means having a second resistance sensor; an amplifier connected to the first bridge means and the second bridge means operable to produce output signals in accordance with the current required to balance the bridge means; switch means connected to a voltage supply, the first bridge means, second bridge means and amplifier; means to trigger the switch means to sequentially operate the switch means to provide separate sequential-pulsed voltages for the first bridge means and second bridge means, said amplifier operative to actuate the switch means in sequence during the times the first bridge means and second bridge means are unbalanced to supply the pulsed voltage sequentially to the first bridge means and second bridge means, whereby the first sensor and second sensor are separately maintained at substantially constant temperatures.

7. The circuit of claim 6 wherein: the first resistance sensor and second resistance sensor are separate resistance films on a common support.

8. The circuit of claim 6 wherein: said means to trigger the switch means is an oscillator imparting a square wave voltage signal to the switch means.

9. The circuit of claim 6 including: a dummy load connected to the switch means, said switch means operative to connect the voltage supply to the dummy load when both bridge means are balanced.

10. The circuit of claim 9 wherein: said amplifier is connected to a negative reference voltage.

11. The circuit of claim 6 wherein: said amplifier is connected to a negative reference voltage.

12. The circuit of claim 6 wherein: said switch means is connected to an external constant voltage supply.

13. A pulsed anemometer circuit comprising: a plurality of bridge means, each bridge means having a resistance sensor; an amplifier connected to each bridge means operable to produce output signals in accordance with current required to balance each bridge means; switch means connected to a voltage supply, the plurality of bridge means, and the amplifier; means to trigger the switch means to sequentially operate the switch means to provide separate sequential pulse voltages for the plurality of bridge means, said amplifier operative to actuate the switch means in sequence during the times the plurality of bridge means are unbalanced to supply the pulsed voltage sequentially to the plurality of bridge means, whereby the sensors are separately maintained at substantially constant temperatures.

14. The circuit of claim 13 wherein: the resistance sensors comprise separate resistance films.

15. The circuit of claim 14 wherein: said means to trigger the switch means is an oscillator imparting a square wave voltage signal to the switch means.

16. The circuit of claim 13 including: a dummy load connected to the switch means, said switch means operative to connect the voltage supply to the dummy load when said plurality of bridge means are balanced.

17. The circuit of claim 13 wherein: said amplifier is connected to a negative reference voltage.

18. The circuit of claim 13 wherein: said switch means is connected to an external constant voltage supply.